United States Patent [19]
Brehler et al.

[11] Patent Number: 5,503,599
[45] Date of Patent: Apr. 2, 1996

[54] BELT TENSIONING DEVICE

[75] Inventors: Henrik Brehler, Aurachtal; Stefan Klein; Martin Sprick, both of Herzogenaurach, all of Germany

[73] Assignee: INA Walzlager Schaeffler KG, Germany

[21] Appl. No.: 328,042

[22] Filed: Oct. 24, 1994

[30] Foreign Application Priority Data

Nov. 10, 1993 [DE] Germany .................. 43 38 446.3

[51] Int. Cl.$^6$ ..................................... F16H 7/10
[52] U.S. Cl. ........................... 474/112; 474/135
[58] Field of Search .................. 474/101, 112, 474/133, 135, 139

[56] References Cited

U.S. PATENT DOCUMENTS 4,886,484  12/1989  Hanes ........................ 474/135

5,234,385   8/1993  Kawashima et al. ........... 474/135

*Primary Examiner*—Roger J. Schoeppel
*Attorney, Agent, or Firm*—Bierman and Muserlian

[57] ABSTRACT

A tension device for belts and chains with a tension arm (1) rotatably supported relative to a stationary machine element (6) and spring-loaded by means of a spring (12) against the traction means, on which tension arm, tension means, in particular a tension roller (2), are provided for bearing against the traction means, between the stationary machine element (6) and an element (7), disposed fixedly on the tension arm, are disposed in series a friction element (10) and a resiliently deformable spring element (11), and the resilient deformation of the spring element (11) is limited by the static friction acting between the element (7) fixedly disposed on the tension arm, and the stationary machine element (6) which avoids impermissibly high belt tensions and undesirably high tension arm excursions.

7 Claims, 1 Drawing Sheet

BELT TENSIONING DEVICE

STATE OF THE ART

A tension device for traction means such as belts and chains, with a tension arm supported rotatably relative to a stationary machine part and spring-loaded by means of a spring against the traction means, on which tension arm are provided tension means, particularly, a tension roller for bearing against the traction means, and with a friction element disposed between the stationary machine part and a part disposed fixedly on the tension arm is known for example from DE-C-41 21 636. Such tension devices are used in belt drives for motor vehicle engines. The loading of the belt varies during operation due to crankshaft irregularities due to thermal expansions of the engine block and due to loading of the aggregate. At constant crankshaft speed and constant loading of auxiliaries disposed in the belt drive, the tension fluctuations are in a range determined experimentally so that the tension arm operates in an approximately constant range of angle of rotation.

Operating states are conceivable in which the belt tension increases pulse-like which acts as a growing torque on the pivot pin of the tension arm and the immediate onset of the effect of the friction disk counteracts directly this tension increase in the belt with a high damping force. This brings about tension peaks in the belt which can exceed the permissible belt tension. The static friction obtaining between the friction disk and its friction partners is exceeded with a correspondingly high torque at the pivot pin. Moreover, their sliding friction being low compared to the static friction, undesirably large excursions of the tension arm can conceivably occur.

OBJECTS OF THE INVENTION

It is an object of the invention to provide a tension device according to the preamble such that even with pulse-like increase of the belt tension, the permissible tension is not exceeded.

This and other objects and advantages of the invention will become obvious from the following detailed description.

THE INVENTION

The tension device of the invention for traction means such as belts and chains, with a tension arm (1) rotatably supported relative to a stationary machine element (6) and spring-loaded by means of a spring (12) against the traction means, on which tension arm, a tension means, particularly a tension roller (2) is provided for placing on the traction means, and with a friction element (10,16) disposed between the stationary machine element (6) and the element (14,7) disposed fixedly on the tension arm, is characterized in that between the stationary machine element (6) and the element (14,7) disposed fixedly on the tension arm are disposed in series a spring element (11, 17), resiliently deformable in the swivel directions of the tension arm (1), and the friction element (10,16) and the resilient deformation of the spring element (11,17) is limited by the static friction acting between the element (7,14), disposed fixedly on the tension arm, and the stationary machine element (6).

The prior art problem is solved due to the fact that between the stationary machine element and the element fixedly disposed on the tension arm a spring element, resiliently deformable in the swivel directions of the tension arm, and the friction element are disposed in series, and the resilient deformation of the spring element is limited by the static friction acting between the element disposed fixedly on the tension arm and the stationary machine element.

During small excursions of the tension arm, only the resiliently deformable spring element, preferably an elastomer, is deformed. However, the friction disk remains in static friction contact with its friction partners. Due to a pulse-like increase of the belt tension, the torque introduced into the spring element is so great that the static friction is overcome and a transition into sliding friction takes place. The friction element is in sliding friction contact with at least one of its friction partners which means that the spring element is not twisted further. With these large tension arm excursions, the friction disk dampens the tension arm motions.

A useful further development of the invention provides that a pivot pin of the tension arm is mounted with interposition of the spring element for limited rotation relative to a bushing and that the bushing is supported rotatably relative to the stationary machine element. With this further development, the spring element can advantageously be disposed in an annular space limited by the bushing and the pivot pin. In this annular space, bearings for the support of the pivot pin relative to the bushing can also be disposed.

In another embodiment, it is useful that the friction element, implemented as a friction disk, is disposed between parallel front faces, facing one another, of a radial flange provided on the bushing and of the housing. The radial extent of the these front faces or the diameter of the friction disk is determined in accordance with the required static friction moment.

In a tension device in which a pivot pin of the tension arm comprises a radial flange, it is useful that a friction disk and a spring element, preferably implemented as a disk, are disposed in series between the radial flange and a contact face associated with the stationary machine element. In this implementation, it is particularly advantageous that the bushing described above can be completely omitted.

Figure 1:
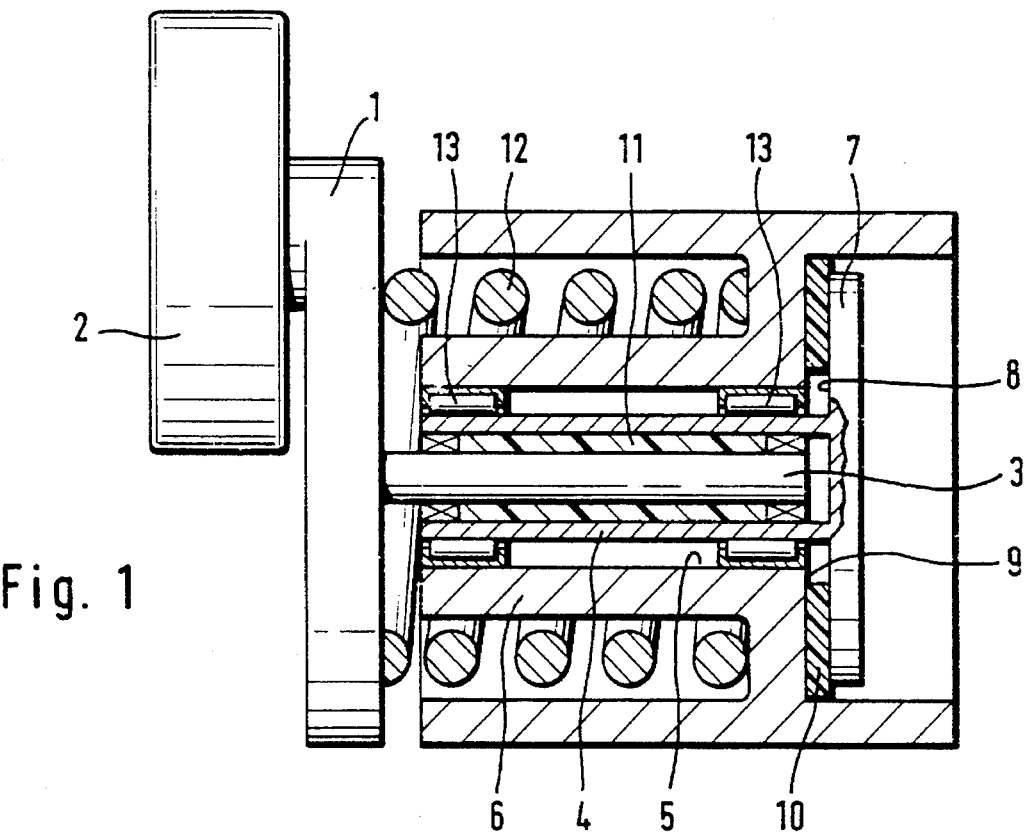
FIG. 1 is a longitudinal cross section through a tension device of the invention.

The tension device of FIG. 1 comprises a tension arm (1) and a tension roller (2) fastened thereon which is provided for resting on a driving belt. A pivot pin (3) of the tension arm (1) is rotatably supported in a bushing (4) and bushing (4), in turn, is disposed coaxially in a housing bore (5) of a housing (6) and supported rotatably relative to this housing (6). At its end facing away from the tension arm (1), the pivot pin (3) comprises a radial flange (7) between the front face (8) of which, facing the tension arm (1), and a front face (9), parallel to it and disposed at the housing side, a friction disk (10) is disposed. Between the pivot pin (3) and the bushing (4), there is inserted a hollow cylinder elastomer (11) whose jacket is fixedly connected with the pivot pin (3) or with the bushing (4).

For spring-loading the tension arm (1) against the belt (not shown), a helical tension spring (12) is provided which is supported on the tension arm (1) and on the housing (3). An axial spring force component brings about that the friction disk (10) is clamped axially between the front faces (8,9). The pivot pin (3) is supported in the bushing (4) by means of bearing (13).

The function of this tension device of the invention will be explained in further detail in the following:

If a torque is introduced via the tension arm (1) into the pivot pin (3), it first rotates relative to the bushing (4). The elastomer (11) is twisted in the process and the force with which the elastomer (11) opposes its twisting, grows with increasing excursion of the tension arm (1). The force does not increase further if, upon reaching a given excursion of the tension arm, the torque which the elastomer (11) transfers to the bushing (4), is greater than the static friction moment between the friction disk (10) and the adjacent radial flange (7) or the housing (6). The onset of the sliding friction between the radial flange (7) and the housing (6) in the direction of rotation of the tension arm (1) brings about that the elastomer (11) is not twisted further. In this way, it is reliably prevented that the permissible belt tension is exceeded.

Where the sliding motion between the radial flange (7) and the housing (6) terminates and a tension arm motion in the opposite direction occurs, the elastomer (11) is rotated back in the direction toward its untwisted position. When this twisting is completely neutralized, the elastomer is in its zero position. With a sliding motion of the radial flange (7) relative to the housing (6), a shift of this zero position occurs by necessity, and specifically by the angle of rotation by which the radial flange (7) is rotated relative to the housing.

Figure 2:
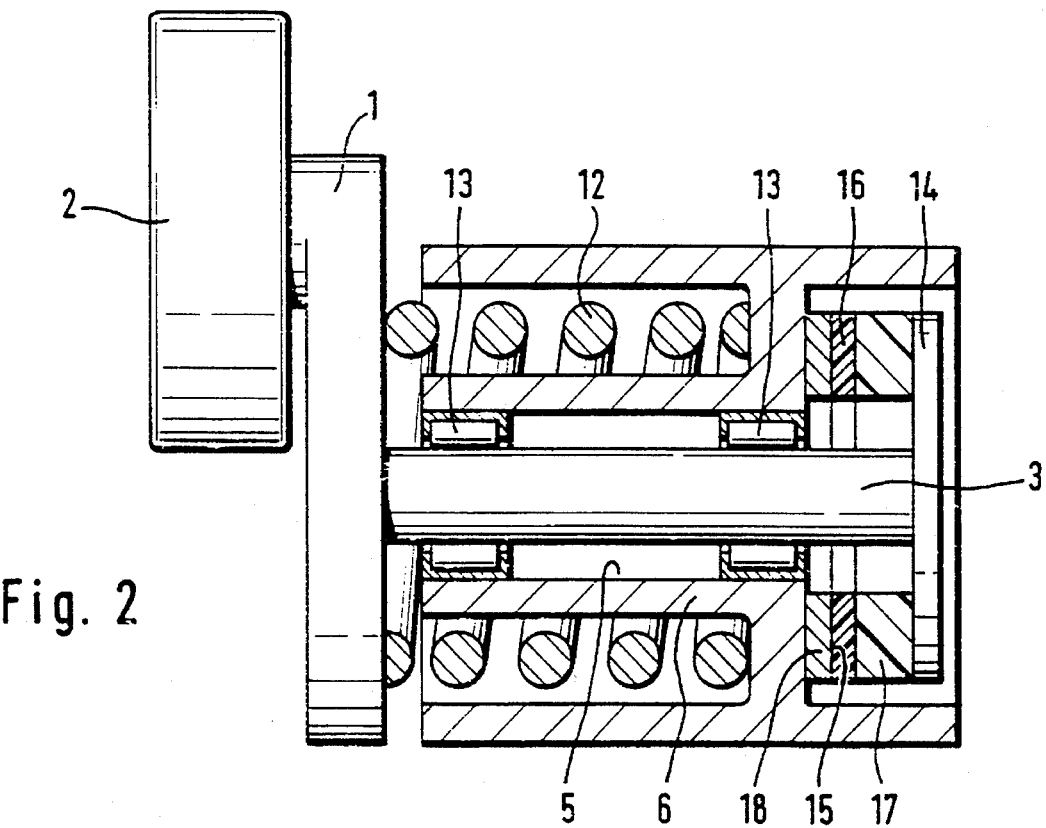
FIG. 2 is a longitudinal cross section through another tension device of the invention.

In the tension device of the invention shown in FIG. 2, the bushing described above and depicted in FIG. 1 is omitted. The pivot pin (3) comprises at its end facing away from the tension arm (1) a radial flange (14) between which radial flange and a contact face (15) associated with the housing (6), a friction disk (16) and a disk (17) made of readily deformable elastomer material is disposed. The functional operation of this tension device is analogous to the embodiment described above. During excursions of the tension arm (1), first, the disk (17) is loaded on rotation and deformed. Only upon reaching a torque stored in the disk (17) is the static friction of the friction disk (16) with its friction partners overcome. With a further excursion of the tension arm (1), a sliding motion of the friction disk (16) relative to the contact face (15) takes place. The contact face (15) can, as depicted here, be implemented on a steel ring (18) connected non-rotatably to the housing (6), but also directly on the housing (6).

Various modifications of the tension device of the invention may be made without departing from the spirit or scope thereof and it is to be understood that the invention is intended to be limited only as defined in the appended claims.

What we claim is:

1. A tension device for traction means such as belts and chains comprising a tension arm (1) mounted rotatable relative to a stationary machine element (6) and urged by a spring (12) towards a traction means, a tension means being provided on the tension arm (1) for bearing against the traction means, said device further comprising a friction element (10, 16) disposed between the stationary machine element (6) and an element (14, 3) fixed on the tension arm, characterized in that the friction element (10, 16) and a spring element (11, 17) which is resiliently deformable in swivel directions of the tension arm (1) are disposed in series between the stationary machine element (6) and the element (14, 3) fixed on the tension arm (1), wherein the resilient deformation of the spring element (11,17) is limited by the static friction acting between the stationary machine element (6) and the element (3, 14) fixed on the tension arm (1).

2. A tension device of claim 1 wherein the tension arm (1) comprises a pivot pin, characterized in that the pivot pin (3) of the tension arm (1) is mounted with interposition of the spring element (11) for limited rotation relative to a bushing (4) which is rotatable relative to the stationary machine element (6).

3. A tension device of claim 2 wherein the spring element (11) is disposed in an annular space defined by the bushing (4) and the pivot pin (3).

4. A tension device of claim 3 wherein the friction element implemented as a friction disk (10) is disposed between a front face (8) of a radial flange (7) of the bushing (4) and a front face (9) of the stationary machine element (6), said front faces (8 and 9) being arranged opposite and parallel to each other.

5. A tension device of claim 1 wherein a pivot pin (3) of the tension arm (1) comprises a radial flange (14), characterized in that a friction disk (16) and a spring element are disposed in series between the radial flange (14) and a contact face (15) associated with the stationary machine element (6).

6. A tension device of claim 5 wherein the spring element is implemented as a disk (17).

7. A tension device of claim 1 wherein the tension means is a tension roller (2).

* * * * *